(12) United States Patent
Murray et al.

(10) Patent No.: US 12,377,987 B2
(45) Date of Patent: Aug. 5, 2025

(54) BLOWER SYSTEM FOR BIDIRECTIONAL FLOW

(71) Applicant: ROLLS-ROYCE plc, London (GB)

(72) Inventors: Christopher A. Murray, Nottingham (GB); Mark J E Bellis, Derby (GB)

(73) Assignee: Rolls-Royce plc

( * ) Notice: Subject to any disclaimer, the term of this patent is extended or adjusted under 35 U.S.C. 154(b) by 249 days.

(21) Appl. No.: 18/171,491

(22) Filed: Feb. 20, 2023

(65) Prior Publication Data
US 2023/0278711 A1    Sep. 7, 2023

(30) Foreign Application Priority Data

Mar. 7, 2022 (GB) .................................... 2203103

(51) Int. Cl.
*B64D 13/02* (2006.01)
*F02C 6/06* (2006.01)
(Continued)

(52) U.S. Cl.
CPC ............... *B64D 13/02* (2013.01); *F02C 6/06* (2013.01); *F02C 7/32* (2013.01); *B64D 2013/0603* (2013.01)

(58) Field of Classification Search
CPC ........ B64D 13/02; B64D 13/04; B64D 13/06; B64D 2013/0603; F02C 9/18; F02C 6/08; F02C 6/06; F02C 7/32
See application file for complete search history.

(56) References Cited

U.S. PATENT DOCUMENTS 4,887,563 A * 12/1989 Ishida ..................... F01L 1/267
123/90.16
6,305,156 B1   10/2001 Lui
(Continued)

FOREIGN PATENT DOCUMENTS

EP          3517436 B1    5/2020
EP          3517437 B1    5/2020
(Continued)

OTHER PUBLICATIONS

European Search report dated Jun. 27, 2023, issued in EP Patent Application No. 23155263.9.
(Continued)

*Primary Examiner* — Thomas P Burke
(74) *Attorney, Agent, or Firm* — Barnes & Thornburg

(57) ABSTRACT

A blower system for a gas turbine engine comprising: a rotor assembly, an airframe port and a routing-control valve. The rotor assembly is configured to be mechanically coupled to a spool of the gas turbine engine. The airframe port is configured to receive and discharge air to an airframe system. The routing-control valve comprises: a primary channel for bidirectional flow between the rotor assembly and the airframe port; a primary valve member configured to open and close the primary channel; and an auxiliary channel branched from the primary channel. The auxiliary channel is configured to bypass the primary valve member for: a first auxiliary flow from the airframe port to the rotor assembly; or a second auxiliary flow for purging air from the rotor assembly to a discharge port. The blower system is configured to operate in an engine drive mode and in a blower mode.

18 Claims, 5 Drawing Sheets

(51) Int. Cl.
    *F02C 7/32*           (2006.01)
    *B64D 13/06*        (2006.01)

(56)                References Cited

U.S. PATENT DOCUMENTS

| | | | |
|---|---|---|---|
| 2014/0290287 A1* | 10/2014 | Houssaye | B64D 41/00 |
| | | | 62/90 |
| 2015/0275758 A1* | 10/2015 | Foutch | F02C 7/047 |
| | | | 60/785 |
| 2015/0275769 A1 | 10/2015 | Foutch et al. | |
| 2016/0130972 A1* | 5/2016 | Kozuch | F02K 3/075 |
| | | | 137/487.5 |
| 2016/0167789 A1 | 6/2016 | Knight et al. | |
| 2017/0191419 A1* | 7/2017 | Bayraktar | F01D 21/00 |
| 2017/0234236 A1 | 8/2017 | Fuelner et al. | |
| 2017/0284408 A1 | 10/2017 | Ricordeau et al. | |
| 2018/0149090 A1 | 5/2018 | Maalouf et al. | |
| 2019/0383220 A1* | 12/2019 | Mackin | F02C 7/277 |
| 2021/0172374 A1 | 6/2021 | Howarth et al. | |
| 2021/0239012 A1* | 8/2021 | Nayak | F02C 7/06 |

FOREIGN PATENT DOCUMENTS

| | | |
|---|---|---|
| EP | 3517438 B1 | 6/2020 |
| EP | 3733519 A1 | 11/2020 |

OTHER PUBLICATIONS

Great Britain search report dated Aug. 18, 2022, issued in Great Britain Patent Application No. 2203103.3.

* cited by examiner

BLOWER SYSTEM FOR BIDIRECTIONAL FLOW

CROSS-REFERENCE TO RELATED APPLICATIONS

This specification is based upon and claims the benefit of priority from United Kingdom Patent Application No. 2203103.3, filed Mar. 7, 2022, the entire contents of which are incorporated herein by reference.

BACKGROUND

Technical Field

The present disclosure relates to blower systems for providing air to airframe systems. The disclosure also concerns a gas turbine engine having a blower system and an aircraft having a blower system or a gas turbine engine.

Description of the Related Art

It is known to pressurise and ventilate a cabin of an aircraft using engine bleed air which is bled from a compressor section of the core of a gas turbine engine. Bleeding high pressure air from the gas turbine engine reduces its efficiency and thereby increases its fuel consumption.

Blower systems which make use of air which is taken from a lower pressure source of a gas turbine engine (such as a bypass duct) and which subsequently compress the engine bleed air prior to delivering it to the cabin are also known, as described in EP3517436 B1, EP3517437 B1 and EP3517438 B1.

SUMMARY

According to a first aspect there is provided a blower system for a gas turbine engine, the blower system comprising: a rotor assembly configured to be mechanically coupled to a spool of the gas turbine engine; an airframe port configured to receive and discharge air to an airframe system; wherein the blower system is configured to operate in an engine drive mode in which air received from the airframe port drives a rotor of the rotor assembly to rotate the spool, and in a blower mode in which the spool drives the rotor to discharge air to the airframe port; and a routing-control valve comprising: a primary channel for bidirectional flow between the rotor assembly and the airframe port; a primary valve member configured to open and close the primary channel; an auxiliary channel branched from the primary channel and configured to bypass the primary valve member for: a first auxiliary flow from the airframe port to the rotor assembly; or a second auxiliary flow for purging air from the rotor assembly to a discharge port.

It may be that the auxiliary channel is a first auxiliary channel for the first auxiliary flow and the routing-control valve further comprises a second auxiliary channel branched from the primary channel and configured to bypass the primary valve member for the second auxiliary flow.

The or each auxiliary channel may be provided with an auxiliary valve member configured to open and close the respective auxiliary channel and the routing-control valve may also comprise an actuator assembly configured to move the routing-control valve between: a primary flow mode in which the primary channel is open and the or each auxiliary channel is closed; and an auxiliary flow mode in which the or each auxiliary channel is open and the primary channel is closed.

It may be that the actuator assembly comprises a unitary valve actuator which mechanically couples the primary valve member to the or each auxiliary valve member. It may also be that the unitary valve actuator is configured to: actuate the primary valve member between open and closed positions; and actuate the or each auxiliary valve member between open and closed positions via a respective cam and cam follower arrangement. Further, it may be that the primary valve member comprises a valve configured to open and close by rotation, for example a butterfly valve or any other suitable valve such as a ball valve, plug valve, gate valve, globe valve and the like.

In addition, it may be that the unitary valve actuator is rotatable through a metering travel corresponding to movement of the primary valve member through a range of open positions to control a flow rate or a pressure of the flow within the primary channel when the routing-control valve is in the primary flow mode. The or each cam and cam follower arrangement may be configured so that the or each auxiliary valve member closes the respective auxiliary channel throughout the metering travel of the unitary valve actuator.

The first auxiliary channel may be provided with a first auxiliary non-return valve configured to prevent air from passing from the rotor assembly to the airframe port via the first auxiliary channel. Additionally or alternatively, the second auxiliary channel may be provided with a second auxiliary non-return valve configured to prevent air from passing from the discharge port to the rotor assembly via the second auxiliary channel.

It may be that the rotor assembly comprises a rotor mechanically coupled to a bearing assembly for the rotor and the first auxiliary channel is configured to provide the first auxiliary flow from the airframe port to the bearing assembly. It may also be that the bearing assembly of the rotor assembly comprises an air-flowing drain or an air bearing. The blower system may further comprise a bearing assembly port configured to discharge the first auxiliary flow of air received by the bearing assembly to an external environment. The discharge port may be configured to discharge the second auxiliary flow to a bypass duct of a gas turbine engine.

According to a second aspect there is provided a gas turbine engine for an aircraft, the gas turbine engine comprising a blower system in accordance with the first aspect. The gas turbine engine may be a propulsive gas turbine engine (e.g., a turbofan). In other examples the gas turbine engine is an auxiliary power unit (APU). According to a third aspect there is provided an aircraft comprising a blower system in accordance with the first aspect or a gas turbine engine in accordance with the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear.

The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
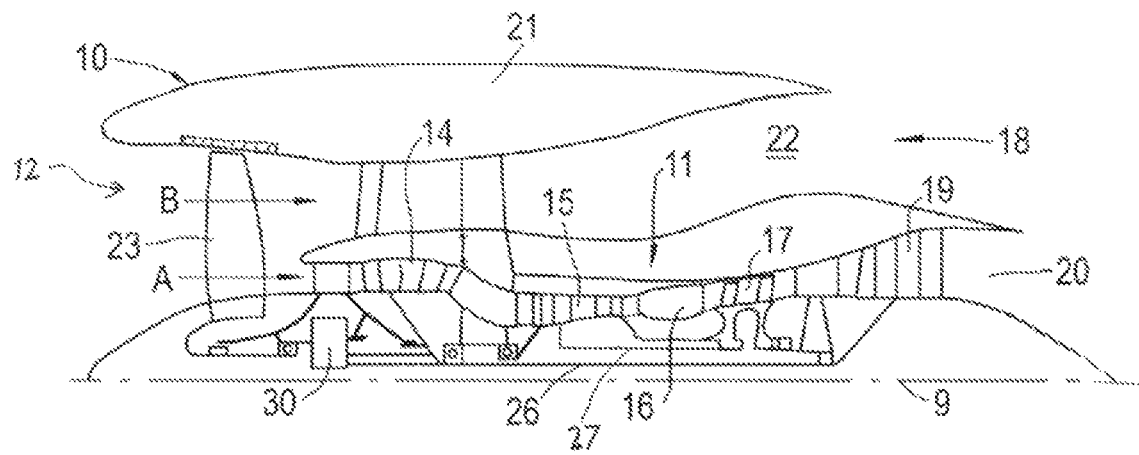
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
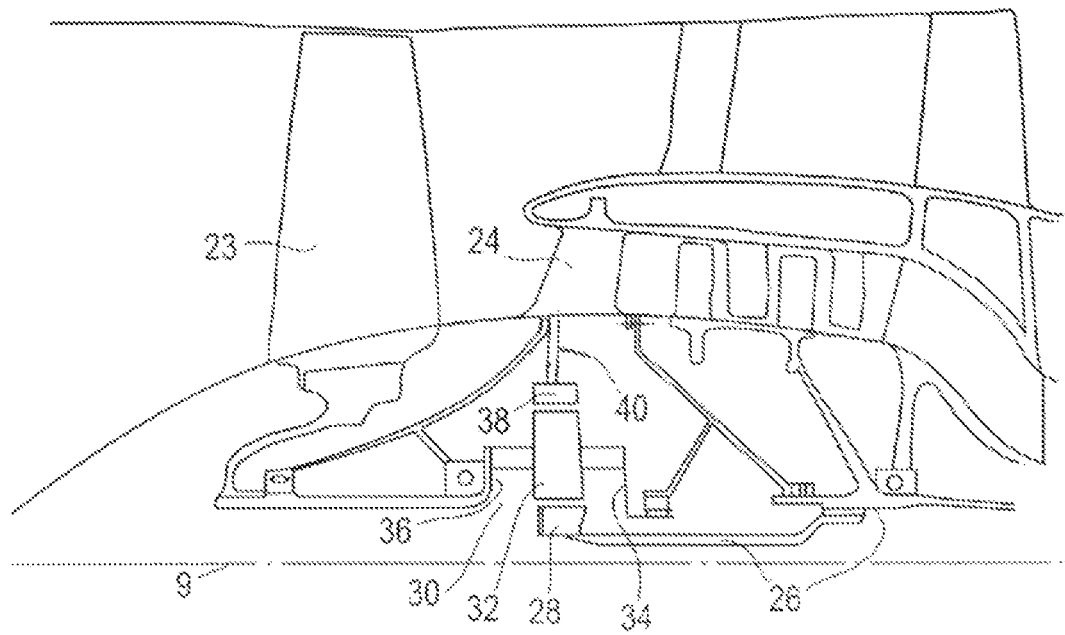
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
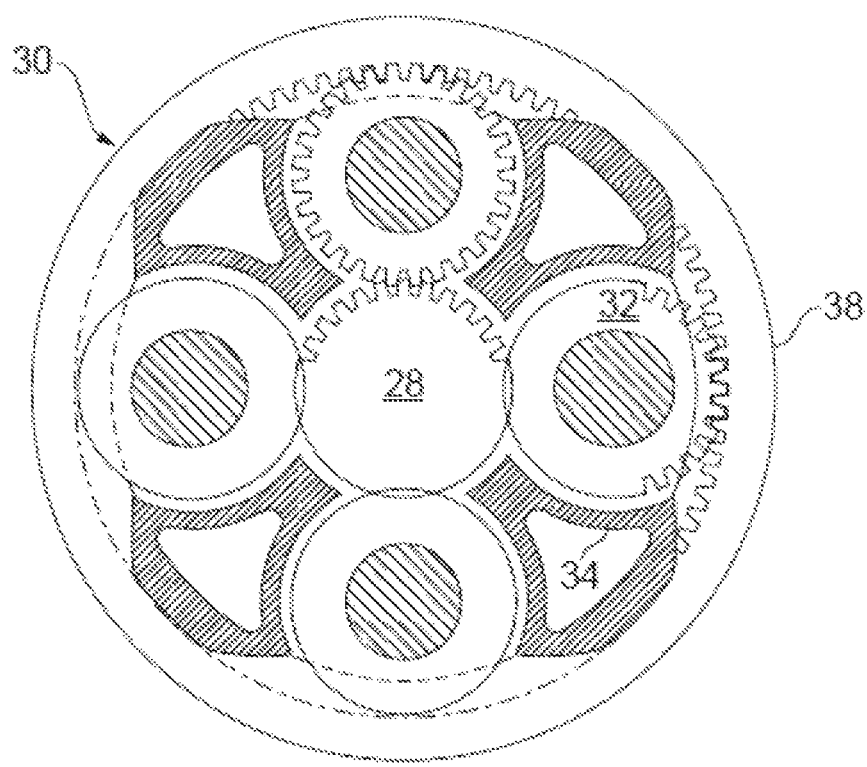
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside of the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
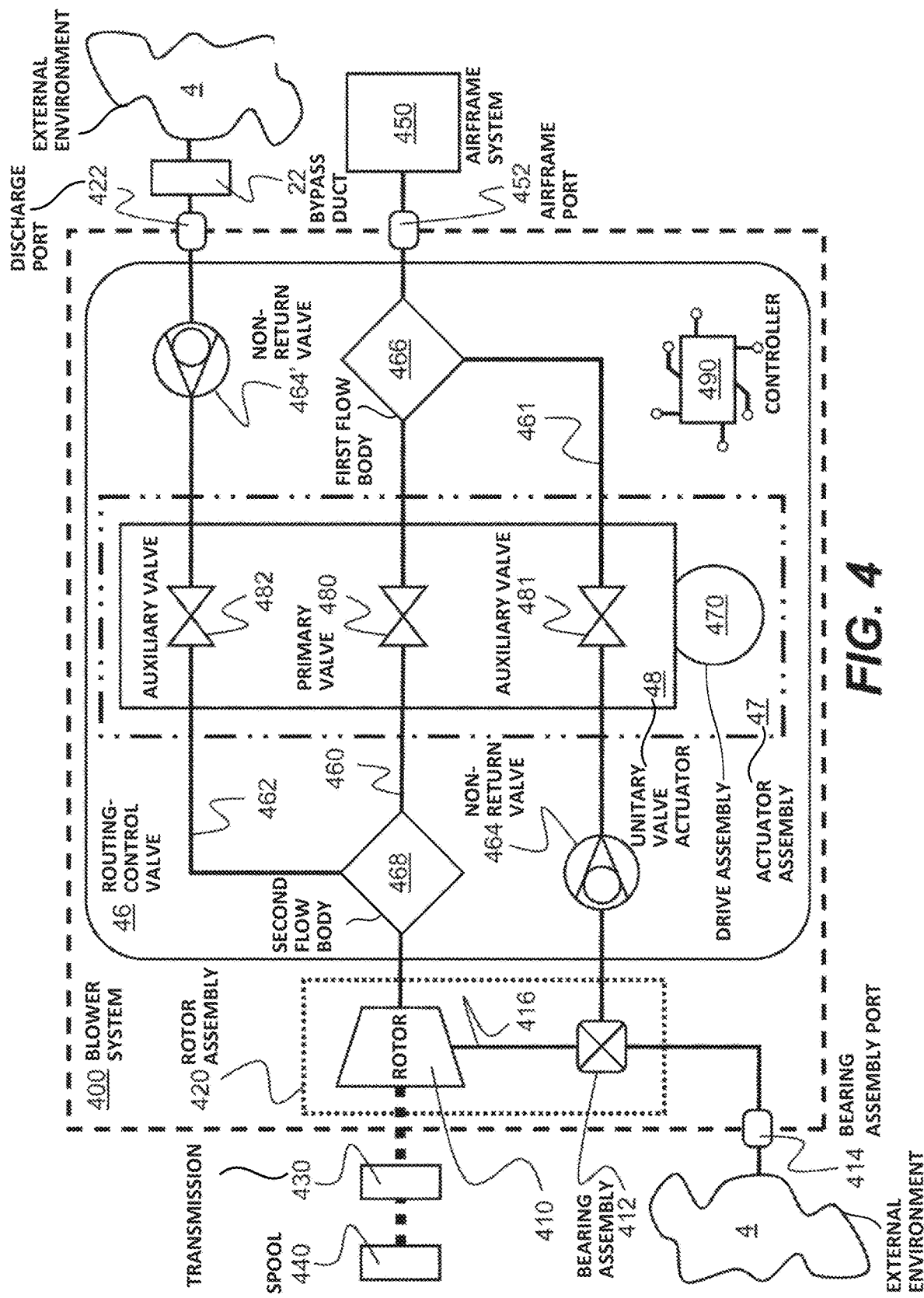
FIG. 4 is a schematic illustration of a blower system according to the present disclosure.

FIG. 4 shows a schematic view of a blower system 400 according to the present disclosure. The blower system 400 is generally configured to provide air to an airframe system 450 for an airframe pressurisation purpose. The airframe pressurisation purpose may include, for example, wing anti-icing, fuel tank inerting, cargo bay smoke eradication and/or aircraft cabin pressurisation.

The blower system 400 comprises a rotor assembly 420. The rotor assembly 420 is configured to be mechanically coupled to a spool 440 of a gas turbine engine. Various suitable variable transmission types will be apparent to those of ordinary skill in the art. For example, the variable transmission 430 may comprise an electric variator, as described in EP 3517436 B1. The rotor assembly 420 is configured to draw and compress air from an air pathway of a gas turbine engine. The air pathway of the gas turbine engine may be, for example, a core duct of the gas turbine engine or a bypass duct of the gas turbine engine. In this way, the rotor assembly 420 is configured to function as a compressor. The rotor assembly 420 is also configured to, in another mode of operation, expand compressed air and thereby drive the spool 440 to rotate, such that the rotor assembly 420 is also configured to function as a turbine.

The rotor assembly 420 comprises a rotor 410 and a bearing assembly 412. The rotor 410 is configured to rotate so as to drive the spool 440 of the gas turbine engine to rotate (i.e. in an engine drive mode), and to draw and compress air from the air pathway of the gas turbine engine (i.e. in a blower mode). The bearing assembly 412 is mechanically coupled to the rotor 410 and is configured to support and permit rotation of the rotor 410. The bearing assembly 412 may be configured to receive a flow of air in use. The bearing assembly 412 may comprise an air bearing (which may also be referred to as a fluid bearing), as will be known to those skilled in the art. The air bearing may be configured to receive a continuous flow of air. For example, the air bearing may comprise a hydrodynamic bearing (which may be a foil bearing, also known as a foil-air bearing) or a hydrostatic bearing, with the flow of air having different purposes respectively. In particular, a hydrodynamic bearing such as a foil-air bearing may be configured to receive the air flow and transfer heat to the airflow to cool the bearing. The hydrodynamic bearing may be configured to support the rotor (e.g. indirectly via a shaft extending into the bearing) by providing a supporting air cushion within the bearing. Alternatively the air bearing may comprise a hydrostatic bearing. The hydrostatic air bearing may be configured to establish an air cushion or film to support the rotor (e.g. indirectly via a shaft extending into the bearing) using the received air flow. In another example, the bearing assembly 412 may comprise an oil-lubricated bearing which includes an air flowing drain, as will also be known to those skilled in the art. An air flowing drain is generally configured to prevent oil disposed within the oil-lubricated bearing from contaminating air within the rotor assembly 420. For this purpose, the air flowing drain may require a continuous flow of air.

The blower system 400 further comprises an airframe port 452. The airframe port 452 is configured to both receive air from the airframe system 450 into the blower system 400 and to discharge air from blower system 400 to the airframe system 450 (in respective modes). In particular, the airframe port 452 may receive compressed air from the airframe system 450. The airframe system 450 may in turn receive compressed air from an external source such as, for example, an auxiliary power unit (APU) of an aircraft or ground starting equipment (GSE).

The blower system 400 is configured to operate in an engine drive mode and a blower mode. In the engine drive mode, compressed air received from the airframe port 452 drives the rotor 410 of the rotor assembly 420 to rotate the spool 440 of the gas turbine engine such that the rotor assembly 420 functions as a turbine. In the blower mode, the spool 440 drives the rotor 410 of the rotor assembly 420 to discharge air to the airframe port 452 for supply to the airframe system 450 such that the rotor assembly 420 functions as a compressor. Accordingly, the blower system 400 is generally configured to enable air to flow from the rotor assembly 420 to the airframe port 452 or to flow from the airframe port 452 to the rotor assembly 420. The blower system 400 may be provided with a controller 490 configured to selectively move the blower system 400 between the engine drive mode and the blower mode. The blower system 400 may comprise the controller 490 as shown in the example of FIG. 4, or the controller 490 may form part of an external system which is not included within the blower system 400. If the blower system 400 comprises the controller 490, the controller 490 may be configured to receive a signal relating to a required operating mode of the blower system 400 from an external system. The external system may be, for example, a controller of a gas turbine engine or a controller of an aircraft to which the blower system 400 is provided.

The blower system 400 further comprises a routing-control valve 46. The routing-control valve 46 comprises a primary channel 460 for bidirectional airflow between the rotor assembly 420 and the airframe port 452, and a primary valve member 480 configured to open and close the primary channel 460. When the primary channel 460 is open, air may flow between the rotor assembly 420 and the airframe port 452 through the primary channel 460. Conversely, when the primary channel 460 is closed, air may not flow (e.g. is prevented from flowing) between the rotor assembly 420 and the airframe port 452. In addition, the rotor assembly 420 comprises a rotor bleed channel 416 configured to direct air provided to the rotor assembly 420 from the primary channel 460 to the bearing assembly 412. Airflow within the primary channel 460 may therefore be directed by the rotor bleed channel 416 to provide the flow of air which for the bearing assembly 412 in use as discussed above.

In the example of FIG. 4, the routing-control valve 46 further comprises a first auxiliary channel 461 branched from the primary channel 460 and configured to bypass the primary valve member 480 for conveying a first auxiliary flow from the airframe port 452 to the rotor assembly 420. The first auxiliary channel 461 may branch from the primary channel 460 via a first flow body 466 of the routing-control valve 46, upstream of the primary valve member 480 with respect to a flow direction from the airframe port 452 to the rotor assembly 420. The expression "flow body" as used herein refers to the physical structure of the routing-control valve which provides for the branching flow. The first auxiliary channel 461 may be configured to provide the first auxiliary flow from the airframe port 452 to the bearing assembly 412, as is shown in FIG. 4. In this way, the first auxiliary flow may provide the flow of air for operation of the bearing assembly 412 in use as discussed above. As shown in FIG. 4, the blower system 400 may further comprise a bearing assembly port 414 configured to discharge the first auxiliary flow of air received by the bearing assembly 412 to an external environment 4.

The example routing control valve 46 also comprises a first auxiliary valve member 481 configured to open and close the first auxiliary channel 461. When the first auxiliary channel 461 is open, air may flow between the airframe port 452 and the rotor assembly 420 through the first auxiliary channel 461. Conversely, when the first auxiliary channel 461 is closed, air may not flow between the airframe port 452 and the rotor assembly 420 through the first auxiliary channel 461 (e.g. such flow may be prevented by the first auxiliary valve member). The first auxiliary channel 461 may be provided with a first auxiliary non-return valve 464 configured to prevent air from passing from the rotor assembly 420 to the airframe port 452 via the first auxiliary channel 461. The routing-control valve 46 may comprise the first auxiliary non-return valve 464, as shown in the example of FIG. 4, or the first auxiliary non-return valve 464 may be disposed outside of the routing-control valve 46 between the routing-control valve 46 and the rotor assembly 420.

Also in the example of FIG. 4, the routing-control valve 46 further comprises a second auxiliary channel 462 branched from the primary channel 460 and configured to bypass the primary valve member 480 for a second auxiliary flow for purging air from the rotor assembly 420 to a discharge port 422. The second auxiliary channel 462 may branch from the primary channel 460 via a second flow body 468 of the routing-control valve 46, upstream of the primary valve member 480 with respect to a flow direction from the rotor assembly 420 to the discharge port 422. The discharge port 422 may be configured to discharge the second auxiliary flow, for example to a bypass duct 22 of a gas turbine engine. The second auxiliary flow may then be exhausted from the bypass duct 22 of the gas turbine engine to the external environment 4.

The example routing control valve 46 further comprises a second auxiliary valve member 482 configured to open and close the second auxiliary channel 462. When the second auxiliary channel 462 is open, air may flow between the rotor assembly 420 and the discharge port 422 through the second auxiliary channel 462. Conversely, when the second auxiliary channel 462 is closed, air may not flow between the rotor assembly 420 and the discharge port 422 through the second auxiliary channel 462 (e.g. such flow may be prevented by the second auxiliary valve member). In some examples, the second auxiliary channel 462 is provided with a second auxiliary non-return valve 464' configured to prevent air from passing from the discharge port 422 to the rotor assembly 420 via the second auxiliary channel 462. The routing-control valve 46 may comprise the second auxiliary non-return valve 464', as shown in the example of FIG. 4, or the second auxiliary non-return valve 464' may be disposed outside of the routing-control valve 46 between the routing-control valve 46 and the discharge port 422. The second auxiliary non-return valve 464' may prevent relatively high pressure air from flowing from the bypass duct 22 of the gas turbine engine into the blower system 400 in use.

In the example of FIG. 4, the routing-control valve 46 comprises both the first auxiliary channel 461 and the second auxiliary channel 462. However, it will be appreciated that in other examples, the routing-control valve 46 may comprise only the first auxiliary channel 461 or the second auxiliary channel 462 and the associated features thereof. In such examples, the first auxiliary channel 461 or the second auxiliary channel 462 may constitute "the auxiliary channel" of the system. In examples comprising both the first auxiliary channel 461 and the second auxiliary channel 462, the first auxiliary channel 461 and the second auxiliary channel 462 may be individually referred to by reference to the generic "auxiliary channel", for example by reference to "each of the auxiliary channels".

The routing-control valve 46 is operable in a primary flow mode and in an auxiliary flow mode. In the primary flow mode, the primary channel 460 is open and the or each auxiliary channel is closed. In the auxiliary flow mode, the or each auxiliary channel is open and the primary channel 460 is closed. The routing-control valve 46 may further comprise an actuator assembly 47 configured to move the routing-control valve 46 between the primary flow mode and the auxiliary flow mode. The controller 490 is further configured to selectively cause the routing-control valve 46 to be moved between the primary flow mode and the auxiliary flow mode by controlling the actuator assembly 47.

In an example of operation, when the blower system 400 is operated in the engine drive mode, the routing-control valve 46 is operated in the primary flow mode by the controller 490. Accordingly, air flows through the primary channel 460 from the airframe port 452 to the rotor assembly 420 to rotate the spool 440 of the gas turbine engine. The first auxiliary valve member 481 is closed to prevent air from the airframe port 452 from flowing to the rotor assembly 420 through the first auxiliary channel 461. The second auxiliary valve member 482 is closed to prevent air from the primary channel from flowing to the discharge port 422. Air from the primary channel 460 is extracted by the rotor bleed channel 416 and is provided to the bearing assembly 412 so as to provide the operating flow of air discussed above. The spool 440 of the gas turbine engine may be driven to rotate by the rotor assembly 420, for example until an engine start operation is completed, or an engine rotation operation (other than an engine start operation) is completed. An example of an engine rotation operation other than start is rotation of the spool 440 of the gas turbine engine to mitigate against rotor-bow effects on the gas turbine engine (i.e. a rotor-bow mitigation process), which may be conducted prior to starting the gas turbine engine.

The blower system 400 may transition from the engine drive mode to the blower mode, such that the rotor assembly 420 moves from functioning as a turbine to functioning as a compressor. The rotor assembly 420 may be controlled to perform a transition operation to enable the rotor assembly 420 to move from functioning as a turbine to functioning as a compressor. For example, the transition operation may include reconfiguring a vane arrangement around the rotor 410 or altering an air pathway to the rotor 410 using a valve system. During the transition operation, it may be advantageous to prevent air from the primary channel 460 being provided to the rotor assembly 420, so that air from the primary channel 460 does not adversely affect the transition operation.

In an example of operation, the routing-control valve 46 is operated in the auxiliary flow mode by the controller 490 when the blower system 400 is transitioning from the engine drive mode to the blower mode. During the transition, air continues to be received into the blower system 400 via the airframe port 452. However, the primary valve member 480 closes the primary channel 460 such that air from the primary channel 460 is not provided to the rotor assembly 420. The first auxiliary valve member 481 opens the first auxiliary channel 461 such that air from the airframe port 452 may flow to the rotor assembly 420 through the first auxiliary channel 461. As a result, the bearing assembly 410 of the rotor assembly 420 may continue to be supplied with the operating flow of air (as discussed above) as the blower system 400 transitions from the engine drive mode to the blower mode, and in particular as the rotor assembly 420 performs the transition operation.

In a further example of operation. when the blower system 400 is operated in the blower mode, the routing-control valve 46 is operated in the primary flow mode by the controller 490. This may be appropriate when the blower system 400 is to provide air to the airframe system 450 for the airframe pressurisation purpose while the blower system 400 is in-flight. In this mode, air flows through the primary channel 460 from the rotor assembly 420 to the airframe port 452 for supply to the airframe system 450. The first auxiliary valve member 481 prevents air from the rotor assembly 420 from flowing back to the rotor assembly 420 through the first auxiliary channel 461 while the second auxiliary valve member 482 prevents air from the rotor assembly 420 from flowing to the discharge port 422 via the second auxiliary channel 462. Air from the primary channel 460 is extracted by the rotor bleed channel 416 and is provided to the bearing assembly 412 so as to provide the operating flow of air as discussed above.

The blower system 400 may be further configured to operate in a purge mode. The controller 490 may be further configured to selectively move the blower system 400 between the engine drive mode, the blower mode and the purge mode. In the purge mode, the spool 440 drives the rotor 410 of the rotor assembly 420 such that the rotor assembly 420 functions as a compressor, similar to operation in the blower mode. However, air from the rotor assembly 420 is not discharged to the airframe port 452 for supply to the airframe system 450. Instead, when the blower system 400 is operated in the purge mode, the routing-control valve 46 is operated in the auxiliary flow mode by the controller 490 such that air from the rotor assembly 420 is initially provided to the primary channel 460 but bypasses the primary valve member 480 for discharge through the discharge port 422. In particular, as the primary valve member 480 closes the primary channel 460 and the second auxiliary valve member 482 opens the second auxiliary channel 462 in the auxiliary flow mode, air from the rotor assembly 420 may flow to the discharge port 422 through the second auxiliary channel 462. Concurrently, air from the primary channel 460 is extracted by the rotor bleed channel 416 and is provided to the bearing assembly 412 so as to provide the operating flow of air thereto. This flow can is subsequently purged to the bearing assembly port 414 (and to the external environment 4) as described above.

With the routing-control valve 46 in the auxiliary flow mode, the first auxiliary valve member 481 opens the first auxiliary channel 461. However, the first auxiliary non-return valve 464 prevents air which has been provided to the bearing assembly 412 (i.e. from the primary channel 460 via the rotor bleed channel 416) from passing to the airframe port 452 via the first auxiliary channel 461.

In the purge mode, air from the rotor assembly 420 is discharged via the rotor bleed channel 416 and/or the second auxiliary channel 462 (as the second auxiliary flow of air) to enable air from the rotor assembly 420 to be purged from the blower system 400 without providing air to the airframe port 452 for discharge to the airframe system 450. As an example of the utility of this operating mode, the blower system 400 may be operated in the purge mode when a gas turbine engine to which the blower system 400 is provided is at risk of ingesting contaminants. As discussed above, the rotor assembly 420 is configured to draw and compress air from the gas turbine engine. As a result, if gas turbine engine ingests contaminants, the air drawn and compressed by the rotor assembly 420 will also contain contaminants. For example, if an aircraft in which the gas turbine engine is incorporated is undergoing a de-icing process on the ground while the gas turbine engine is running, the gas turbine engine is likely to ingest de-icing fluid.

The blower system 400 as discussed above therefore provides an integrated solution (i.e. integrated with other mode-switching apparatus) for purging contaminated air from the blower system 400 without providing contaminated air to the airframe system 450 or allowing contaminants to build up within the blower system 400 (such as within the routing-control valve 46) which may otherwise be flushed through to the airframe system if the blower system subsequently transitions into the blower mode. This may prevent contaminated air from being provided to a cabin of the aircraft when the aircraft pressurisation purpose includes aircraft cabin pressurisation.

In the example of FIG. 4, the actuator assembly 47 comprises a unitary valve actuator 48. The unitary valve actuator 48 mechanically couples the primary valve member 480 to the or each auxiliary valve member. In particular, the unitary valve actuator 48 is configured to actuate the primary valve member 480 between open and closed positions corresponding to the primary channel 460 being open and closed respectively and also to actuate the or each auxiliary valve member 481 between open and closed positions corresponding to the or each auxiliary channel being open and closed respectively. The unitary valve actuator 48 is configured to actuate the primary valve member 480 and the or each auxiliary valve member having only a single point of mechanical failure, which in turn provides improved reliability to the blower system 400.

The example actuator assembly 47 comprises a drive assembly 470 configured to drive the unitary valve actuator 48. The drive assembly 470 may include, for example, an electro-pneumatic servo valve (EPSV), a pneumatic solenoid, fueldraulic actuator (i.e. using fuel as the force-transmitting fluid in the actuator), oildraulic actuator (i.e. using a lubricant as the force-transmitting fluid in the actuator), hydraulic actuator or any suitable type of electric actuator. The unitary valve actuator 48 and the drive assembly 470 together permit actuation of the primary valve member 480 and the or each auxiliary valve member using a relatively simple electrical or electronic control system, which is associated with a decreased installation mass and/or a decreased installation size of the blower system 400 as well as improved reliability thereof.

The unitary valve actuator 48 may comprise a connecting shaft 600 having a geometry which defines a cam structure. The or each auxiliary valve member 481, 482 may be provided with a respective cam follower 602, 604. The cam structure of the connecting shaft is configured such that a respective cam 608, 610 is provided to the or each cam follower 602, 604, the respective cam 608, 610 being configured to apply a mechanical force to the or each cam follower 602, 604 and thereby control the or each auxiliary valve member 481, 482. Accordingly, the unitary valve actuator 48 is configured to actuate the or each auxiliary valve member 481, 482 between open and closed positions via a respective cam and cam follower arrangement. The primary valve member 480 may comprise a butterfly valve or any other suitable valve, for example a ball valve, plug valve, gate valve, globe valve and the like. The connecting shaft 600 may provide a spindle shaft 612 which is configured to rotate the butterfly valve and thereby control the primary valve member 480.

The unitary valve actuator 48 may be rotatable through a metering travel corresponding to movement of the primary valve member 480 through a range of open positions to control a flow rate or a pressure of the flow within the primary channel 460 when the routing-control valve 46 is in the primary flow mode. The unitary valve actuator 48 may be rotatable through the range of open positions within the metering travel so as to rotate the connecting shaft 600 and the butterfly valve 480 through a range of orientations within the primary channel 460 and thereby selectively restrict flow within the primary channel 460 to control the flow rate and/or the pressure of the flow within the primary channel 460 when the routing-control valve 46 is in the primary flow mode.

Control of the flow rate and/or the pressure of the flow rate and/or the pressure of the flow within the primary channel 460 enables the flow rate and/or the pressure of air provided to the rotor assembly 420 in the engine drive mode to be controlled by the controller 490. In turn, this may enable the speed or rotation of the spool 440 of the gas turbine engine to more precisely controlled by the controller 490 during the rotor-bow mitigation and/or during the engine start process discussed above.

As described above, when the routing-control valve 46 is in the primary flow mode, the primary channel 460 is open and the or each auxiliary channel is closed. Accordingly, in examples in which the unitary valve actuator 48 comprises the connecting shaft which defines the cam structure described above, it may be that the or each cam and cam follower arrangement is configured so that the or each auxiliary valve member closes the respective auxiliary channel throughout the metering travel of the unitary valve actuator 48. In particular, the or each cam defined by the geometry of the connecting shaft may be configured to apply a mechanical force to the or each cam follower such that the or each auxiliary channel is closed throughout the metering travel of the unitary valve actuator 48.

Figure 5:
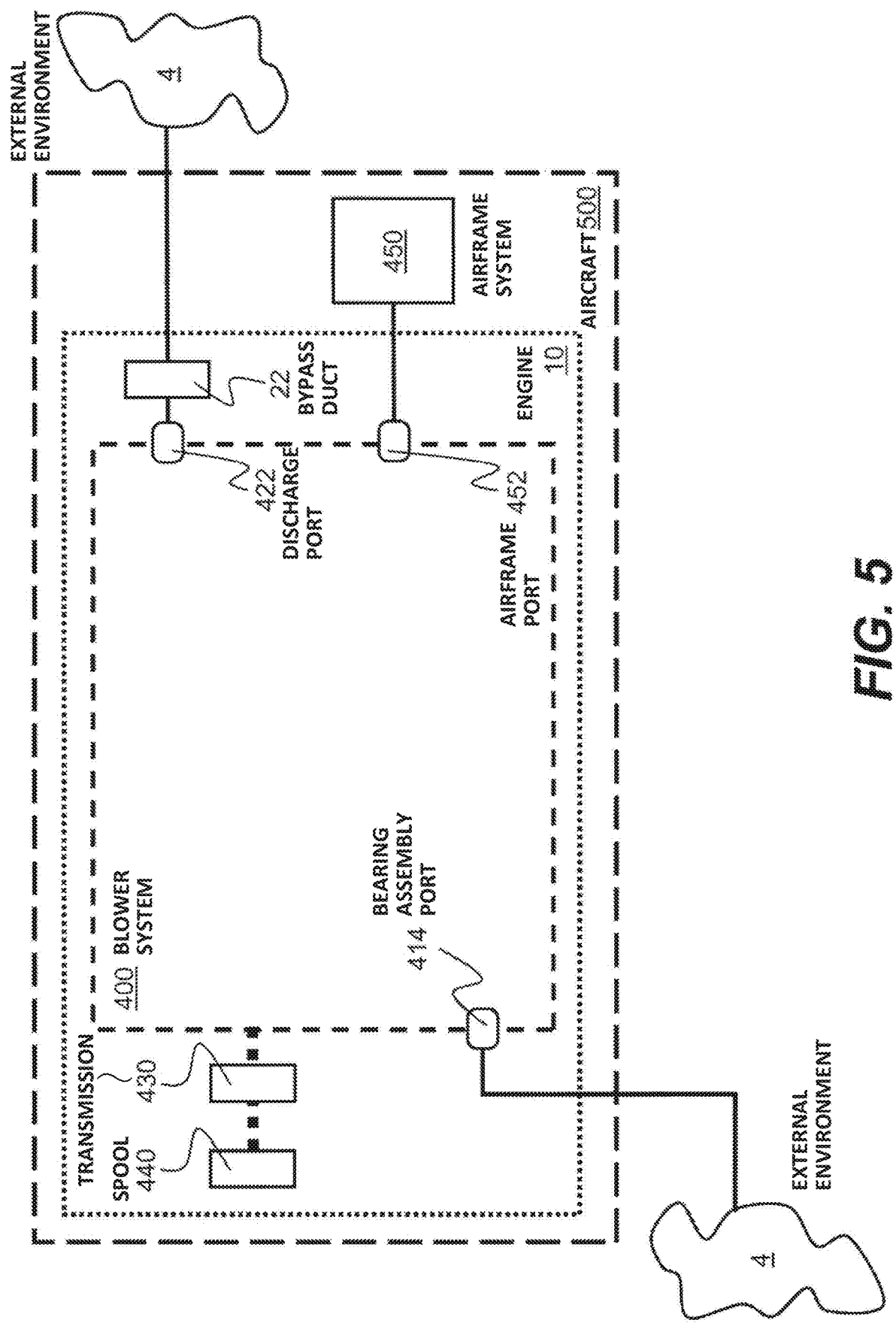
FIG. 5 is a schematic illustration of a gas turbine engine comprising the blower system of FIG. 4.
Figure 6:
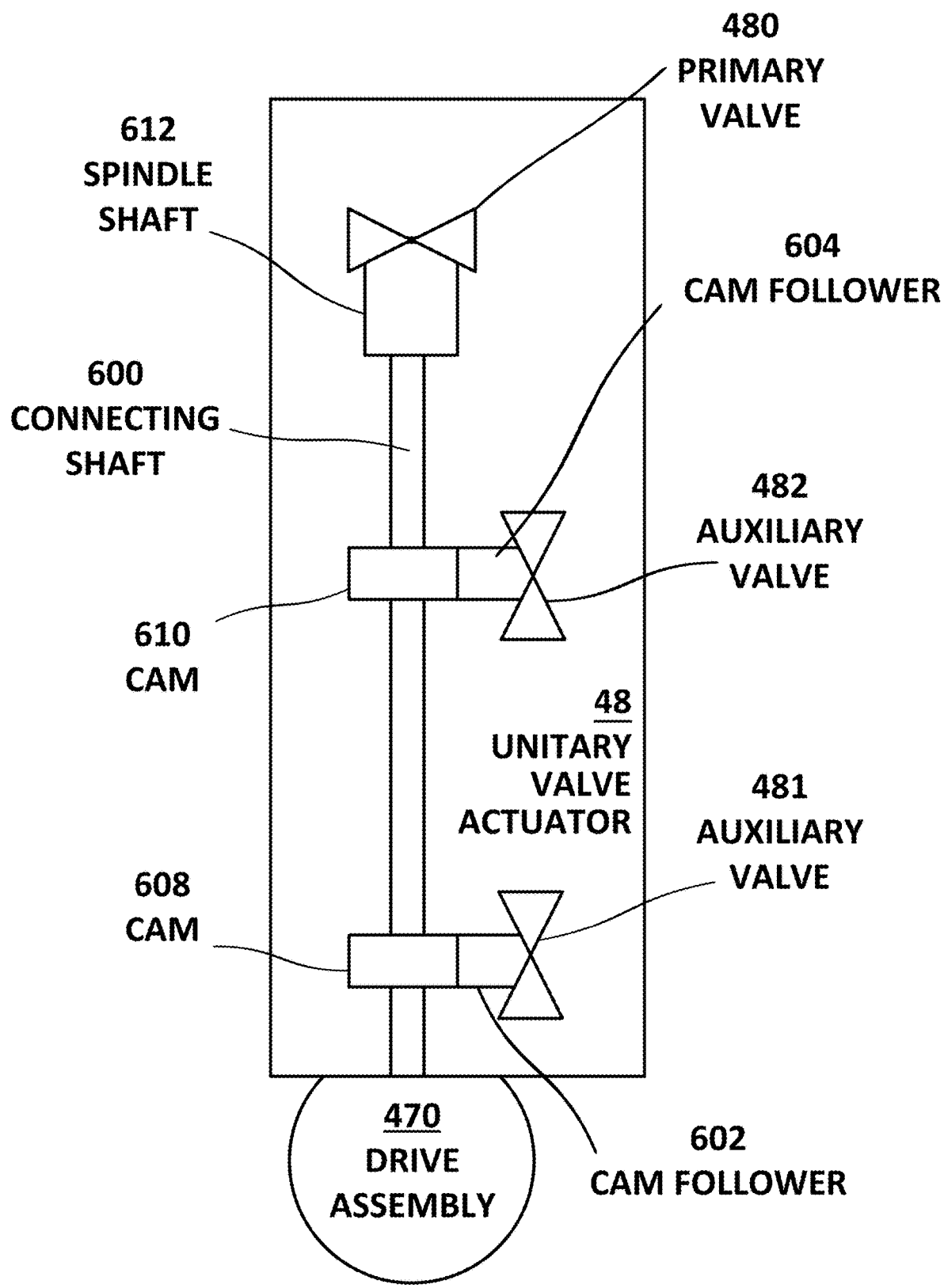

FIG. 5 shows a schematic view of a gas turbine engine 10 comprising a blower system 400 in accordance with the example described above with reference to FIG. 4. The gas turbine engine 10 provides the spool 440 and where present the variable transmission 430. In examples in which the discharge port 422 is configured to discharge the second auxiliary flow to a bypass duct 22 of a gas turbine engine, the gas turbine engine 10 provides the bypass duct 22. The second auxiliary flow may be discharged elsewhere in variants of such examples, for example into the engine core flow, or to an engine drain mast of the gas turbine engine. Otherwise, the gas turbine engine may be in accordance with the gas turbine engine 10 described above with reference to FIG. 1 and/or FIG. 2. FIG. 5 also shows an aircraft 500 comprising the gas turbine engine 10. The aircraft 500 provides the airframe system 450. However, it will be appreciated that the aircraft 500 may only comprise the blower system 400 and be configured to receive the gas turbine engine 10, for example at a pylon of the aircraft 500.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

The invention claimed is:

1. A blower system for a gas turbine engine, the blower system comprising:
 a variable transmission,
 a rotor assembly configured to be mechanically coupled to a spool of the gas turbine engine via the variable transmission;
 an airframe port configured to receive and discharge air to an airframe system;
 wherein the blower system is configured to operate in an engine drive mode in which air received from the airframe port drives a rotor of the rotor assembly to rotate the spool, and in a blower mode in which the spool drives the rotor to discharge air to the airframe port; and
 a routing-control valve comprising:
 a primary channel for bidirectional flow between the rotor assembly and the airframe port;
 a primary valve member configured to open to allow a primary flow of air between the airframe port and the rotor assembly via the primary channel in the engine drive mode and the blower mode and to close to block the primary flow of air through the primary channel;
 at least one auxiliary channel branched from the primary channel and configured to bypass the primary valve member for:
 a first auxiliary flow from the airframe port to the rotor assembly; or
 a second auxiliary flow for purging air from the rotor assembly to a discharge port.

2. The blower system according to claim 1, wherein the or each auxiliary channel is provided with an auxiliary valve member configured to open and close the respective auxiliary channel; and
 the routing-control valve comprises an actuator assembly configured to move the routing-control valve between:
 a primary flow mode in which the primary channel is open and the or each auxiliary channel is closed; and
 an auxiliary flow mode in which the or each auxiliary channel is open and the primary channel is closed.

3. The blower system according to claim 2, wherein the actuator assembly comprises a unitary valve actuator which mechanically couples the primary valve member to the or each auxiliary valve member.

4. The blower system according to claim 3, wherein the unitary valve actuator is configured to:
 actuate the primary valve member between open and closed positions; and
 actuate the or each auxiliary valve member between open and closed positions via a respective cam and cam follower arrangement.

5. The blower system according to claim 4, wherein the unitary valve actuator is rotatable through a metering travel corresponding to movement of the primary valve member through a range of open positions to control a flow rate or a pressure of the flow within the primary channel when the routing-control valve is in the primary flow mode.

6. The blower system according to claim 5, wherein the or each cam and cam follower arrangement is configured so that the or each auxiliary valve member closes the respective auxiliary channel throughout the metering travel of the unitary valve actuator.

7. The blower system according to claim 1, wherein the auxiliary channel is a first auxiliary channel for the first auxiliary flow; and
 the routing-control valve further comprises a second auxiliary channel branched from the primary channel and configured to bypass the primary valve member for the second auxiliary flow.

8. The blower system according to claim 7, wherein the first auxiliary channel is provided with a first auxiliary non-return valve configured to prevent air from passing from the rotor assembly to the airframe port via the first auxiliary channel.

9. The blower system according to claim 7, wherein the second auxiliary channel is provided with a second auxiliary non-return valve configured to prevent air from passing from the discharge port to the rotor assembly via the second auxiliary channel.

10. The blower system according to claim 7, wherein the rotor assembly comprises a rotor mechanically coupled to a bearing assembly for the rotor,
 the primary channel is configured to provide the primary flow of air from the airframe port to the rotor in the engine blower mode, and
 the first auxiliary channel is configured to provide the first auxiliary flow from the airframe port to the bearing assembly in an auxiliary flow mode in which the primary valve is closed to block the primary flow of air to the rotor.

11. The blower system according to claim 10, wherein the bearing assembly of the rotor assembly comprises an air-flowing drain or an air bearing.

12. The blower system according to claim 10, further comprising a bearing assembly port configured to discharge the first auxiliary flow of air received by the bearing assembly to an external environment.

13. The blower system according to claim 1, wherein the discharge port is configured to discharge the second auxiliary flow to a bypass duct of a gas turbine engine.

14. A gas turbine engine for an aircraft, the gas turbine engine comprising the blower system of claim 1.

15. An aircraft comprising:
 the blower system according to claim 1.

16. An aircraft comprising:
 the gas turbine engine according to claim 14.

17. The blower system according to claim 10, wherein the rotor assembly comprises a rotor bleed channel configured to direct air provided to the rotor assembly from the primary channel to the bearing assembly.

18. The blower system of claim 1 further comprising a controller configured to open the primary valve member in the engine drive mode and configured to open the primary valve in the blower mode.

* * * * *